US012623826B2

(12) United States Patent
Jarisch et al.

(10) Patent No.: US 12,623,826 B2
(45) Date of Patent: May 12, 2026

(54) PACKAGING, SUPPORT FOR SUCH A PACKAGING AND DOSING SYSTEM COMPRISING SUCH A PACKAGING

(71) Applicant: SOCIETE DES PRODUITS NESTLE S.A., Vevey (CH)

(72) Inventors: Christian Jarisch, Lutry (CH); Laura Priester, Puidoux (CH); Lucio Scorrano, Yverdon-les-Bains (CH); Jonathan Gebs, Gland (CH); Fabrice Yerly, Montreux (CH)

(73) Assignee: Société des Produits Nestlé S.A., Vevey (CH)

( * ) Notice: Subject to any disclaimer, the term of this patent is extended or adjusted under 35 U.S.C. 154(b) by 291 days.

(21) Appl. No.: 18/560,479

(22) PCT Filed: May 10, 2022

(86) PCT No.: PCT/IB2022/054344
§ 371 (c)(1),
(2) Date: Nov. 13, 2023

(87) PCT Pub. No.: WO2022/238903
PCT Pub. Date: Nov. 17, 2022

(65) Prior Publication Data
US 2024/0246742 A1     Jul. 25, 2024

(30) Foreign Application Priority Data
May 12, 2021     (EP) ..................................... 21173655

(51) Int. Cl.
B65D 77/40        (2006.01)
A47J 31/40        (2006.01)
B65D 75/70        (2006.01)

(52) U.S. Cl.
CPC ............ B65D 77/40 (2013.01); A47J 31/404 (2013.01); B65D 75/70 (2013.01)

(58) Field of Classification Search
CPC ......... B65D 75/70; B65D 77/40; A47J 31/404
See application file for complete search history.

(56) References Cited

U.S. PATENT DOCUMENTS 4,258,863  A      3/1981  Ness
5,732,853  A  *   3/1998  Ganzeboom ........... B65D 75/70
                                                        222/89

(Continued)

FOREIGN PATENT DOCUMENTS

CA        2688689 C       6/2015
DE        19955483 C1     5/2001

(Continued)

OTHER PUBLICATIONS

Machine Translation of EP_3108842_A1_H.*
European Office Action for Appl No. 23208456.6-1014 dated Apr. 16, 2024, 7 pages.

*Primary Examiner* — Jeremy Carroll
(74) *Attorney, Agent, or Firm* — Thorpe North & Western, LLP

(57)          ABSTRACT
The present invention is directed to a packaging (1) comprising: —a body (2) defining an interior volume (6) for carrying a flowable product, and—an opening element (4) comprising an opening part (4.0) which is arranged inside the interior volume (6). The body (2) is configured such that, when a predetermined external force (F) is exerted on an activation section (8) of the body (2), the activation section (8) is displaced relative to the interior volume (6) so as to activate the opening element (4) until the opening part (4.0) creates an opening extending in an openable section (12) of the body (2) and allowing the flowable product to flow out of the interior volume (6).

38 Claims, 6 Drawing Sheets

(56)        References Cited

U.S. PATENT DOCUMENTS

| | | | |
|---|---|---|---|
| 6,250,506 B1 | 6/2001 | Geiger et al. | |
| 6,443,307 B1 | 9/2002 | Burridge | |
| 6,622,864 B1 * | 9/2003 | Debbs | A61B 50/30 |
| | | | 206/363 |
| 2002/0113089 A1 * | 8/2002 | Nehren | B05C 17/00586 |
| | | | 222/207 |
| 2002/0145013 A1 | 10/2002 | Chrisman et al. | |
| 2008/0177246 A1 | 7/2008 | Sullivan et al. | |
| 2010/0320208 A1 | 12/2010 | Suzuki | |
| 2012/0248143 A1 | 10/2012 | Gigandet et al. | |

FOREIGN PATENT DOCUMENTS

| | | | |
|---|---|---|---|
| EP | 3108842 A1 * | 12/2016 | A61K 8/922 |
| JP | 2009202942 | 9/2009 | |
| JP | 6162870 | 7/2017 | |
| WO | 2011007266 | 1/2011 | |
| WO | 2011007266 A1 | 1/2011 | |
| WO | 2016089329 | 6/2016 | |

* cited by examiner 2.8    4.1    8    7    1    6    4.4    19    4.5    20    V    2.6

FIG. 15
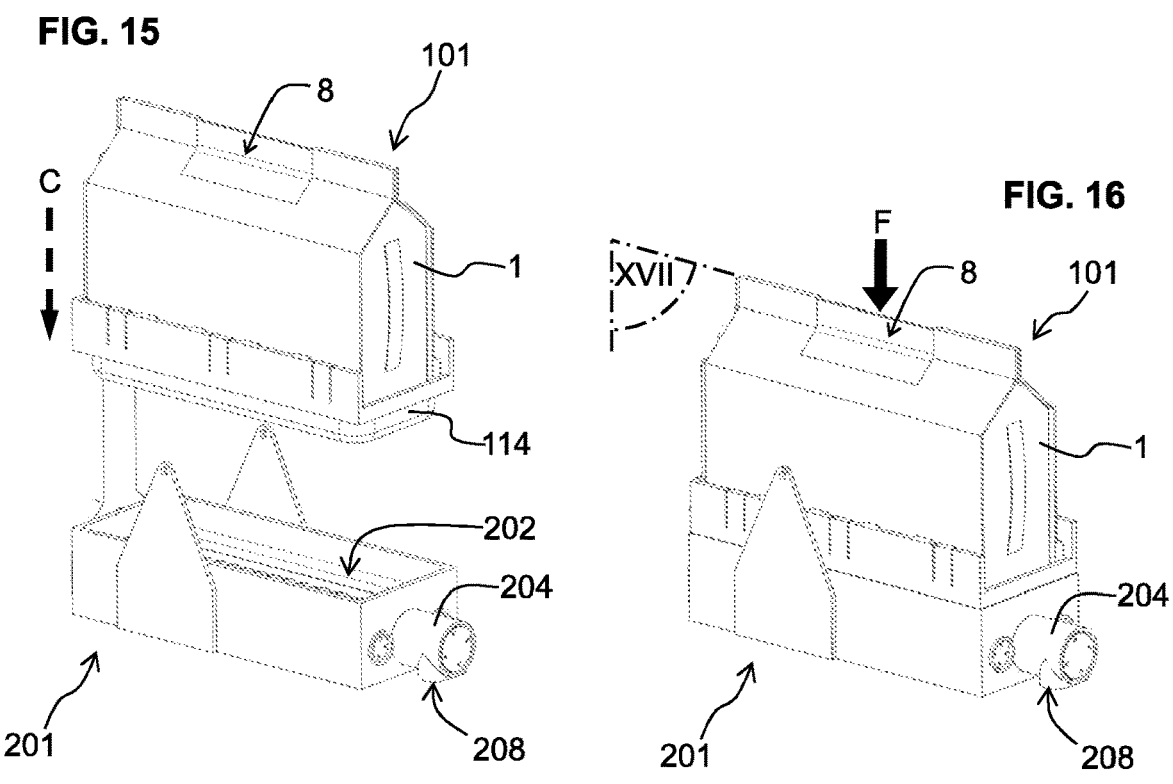
FIG. 16
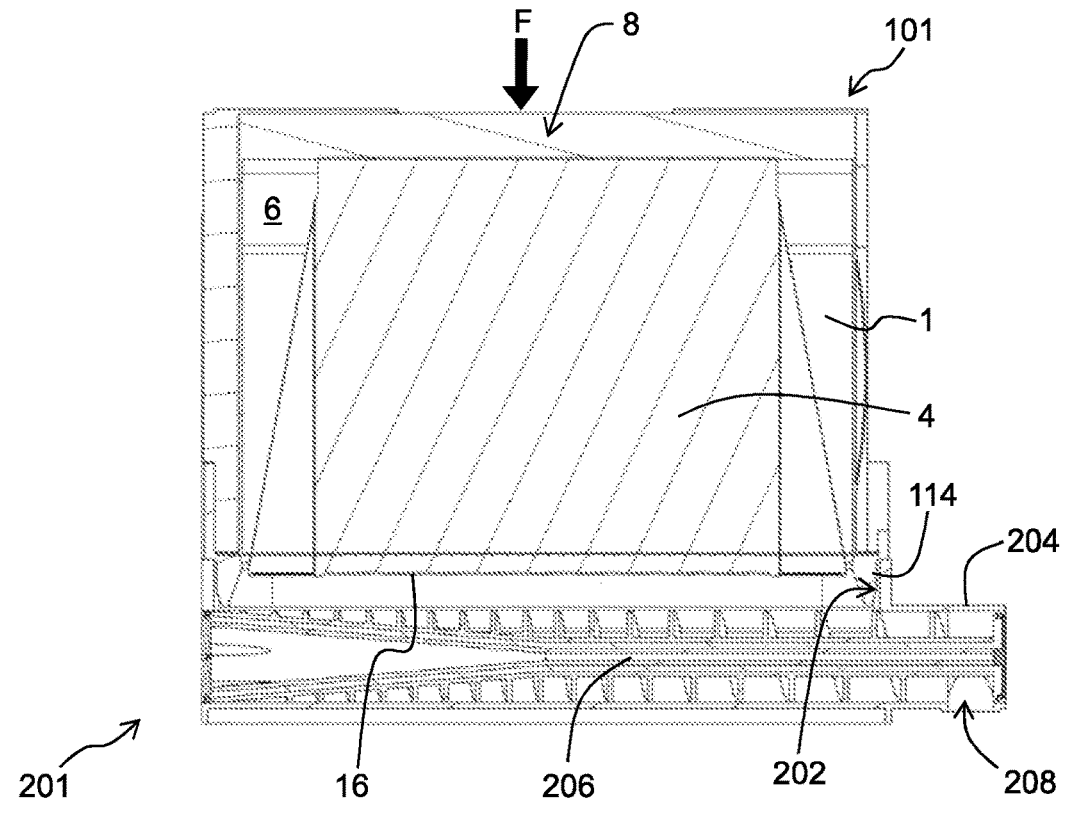
FIG. 17

PACKAGING, SUPPORT FOR SUCH A PACKAGING AND DOSING SYSTEM COMPRISING SUCH A PACKAGING

CROSS REFERENCE TO RELATED APPLICATIONS

The present application is a National Stage of International Application No. PCT/IB2022/054344, filed on May 10, 2022, which claims priority to European Patent Application No. 21173655.8, filed on May 12, 2021, the entire contents of which are being incorporated herein by reference.

1. FIELD OF THE INVENTION

The present invention is directed to a packaging for containing a flowable product, in particular an edible flowable product. The invention is further directed to a support configured for carrying such a packaging. The present invention is also directed to a dosing system comprising such a packaging and configured for delivering multiple doses of the flowable product contained in the packaging to allow the preparation of a food or beverage product like coffee, tea, soup etc.

2. TECHNICAL BACKGROUND

From U.S. Pat. No. 6,250,506B1 is known a dosing system configured to receive a bulk packaging of powder and to dispense the powder flowing out of the packaging. A bottom side of the packaging is initially closed by a slidable band. Once the packaging is positioned in the dosing system, the slidable band can be removed by sliding it in a slot located below the packaging. Removing the sliding band frees a passage through which the powder may flow out of the packaging by gravity and into a dosing unit. The bulk packaging and the dosing system of U.S. Pat. No. 6,250,506B1 avoids a contact between the powder and a user recharging and discharging the powder into and out of the dosing system.

However, in the dosing system of U.S. Pat. No. 6,250,506B1, the powder soils the surfaces exposed to it, in particular the slot where the band slides. So, when replacing the bulk packaging, the user must carry out a thorough cleaning of these soiled surfaces, which might be difficult due to the geometry of the slot.

3. SUMMARY OF THE INVENTION

It is thus an object of the present invention to provide a packaging, a support for such a packaging and a dosing system comprising such a packaging, which enable a user to conveniently and quickly recharge a flowable product into the dosing system while keeping the flowable product clean and sealed into the packaging.

According to an aspect, the present invention is directed to a packaging comprising:
- a body defining an interior volume for carrying a flowable product, and
- an opening element comprising an opening part which is arranged inside the interior volume, wherein the body is configured such that, when a predetermined external force is exerted on an activation section of the body, the activation section is displaced relative to—e.g. towards or away from—the interior volume so as to activate the opening element until the opening part creates an opening extending in an openable section of the body and allowing the flowable product to flow out of the interior volume.

In service, once the packaging is coupled to a dosing system, the packaging may be opened from inside by the opening part arranged partially or totally in the interior volume. Thus, the packaging enables a user to conveniently charge a new packaging in the dosing system and open the new packaging while keeping the flowable product clean and sealed into the packaging.

The interior volume may be carrying the flowable product when the body is closed, and the interior volume may dispense the flowable product once the body is opened.

In the present disclosure, the term "flowable product" may refer to any product that may flow or be poured under the action of gravity, in particular powdery products. In particular, the flowable product may be an edible substance, e.g. coffee (soluble coffee, green coffee beans, roast coffee beans, roast and ground coffee beans), tea, milk powder, soup powder, bouillon powder, beverage whitener, confectionery (e.g. panned confectionery) or dried pet food.

According to an embodiment, the activation section may be displaced towards the interior volume so as to activate the opening element until the opening part creates the opening.

Thus, the predetermined external force may push the activation section, which may deform the body and may in turn push the opening element towards the openable section. An advantage of displacing the activation section towards the interior volume—i.e. pushing it towards the bottom wall—may be that the body contracts when getting deformed, which minimizes its footprint during the creation of the opening.

In an alternative embodiment, the activation section may be displaced away from the interior volume so as to activate the opening element until the opening part creates the opening. Thus, the predetermined external force may pull the activation section, which deforms the body and in turn pulls the opening element which then may tear the openable section.

In this alternative embodiment, the opening element may preferably comprise a fastening part that may be fastened to the body, for example sealed in a body section opposite the openable section. Thus, the fastening part may transmit the pulling force to the opening element. Further in this alternative embodiment, the opening element may preferably be secured to the openable section. Thus, when a user exerts a predetermined external traction force by pulling on the activation section, hence on the opening element, the opening element may draw the openable section and tear it open.

In yet another alternative embodiment, instead of pushing or pulling, the displacement of the activation section relative to the interior volume, so as to activate the opening element until the opening part creates the opening, may be different from towards or away from the interior volume, for example substantially parallel to the interior volume. The design and arrangement of the body and opening element may still be selected suitably for the opening element to create the opening.

As a technical effect common to these alternative embodiments, the opening element may apply, on the openable section, mechanical stresses that are large enough to create the opening, preferably to tear open the openable section.

According to an embodiment, the opening part may extend between the activation section and the openable section, preferably from the activation section almost to the openable section.

Thus, the predetermined external force may be transmitted by the opening to the openable section over a relatively short distance, which may facilitate the manual opening of the packaging.

According to an embodiment, the opening part may comprise an activation part facing the openable section, and the activation part may be configured to interact with the openable section when the opening element is activated until the activation part creates the opening, preferably by tearing the openable section.

Thus, the activation part may reliably open the openable section upon activation of the opening element.

According to an embodiment, the activation part may be formed by an edge of the opening element and/or the activation part may be comprised of a cutting edge. Preferably, when seen across the openable section, the opening part and preferably its activation part may span substantially the interior volume.

Thus, such an edge or cutting edge may pierce or tear open the openable section along a calibrated opening. Thus, the opening part may extend over much or all of the openable section, which may ensure the creation of a large opening, hence of a large flow rate of flowable product.

According to an embodiment, the openable section may be positioned at a side of the body opposite the activation section relative to the interior volume.

Thus, the design of the packaging may be relatively simple, while ensuring reliable operations.

According to an embodiment, the openable section may comprise a weakened portion, like a tear line or incisions, preferably extending along the activation part if present.

Thus, the openable section may be opened easily by a user by means of the activation section, while ensuring a calibrated opening.

In some embodiment, the opening element may generally have the shape of a rectangle.

According to an embodiment, the body may be a sealed bag or sealed pouch, the body may have at least one sealing line, and the opening element may further comprise a fastening part, the fastening part being sealed in the at least one sealing line, the at least one sealing line being preferably formed at or near the activation section.

Thus, the opening element may be fastened to the body, such that displacing the activation section may directly displace the fastening part, hence the opening part.

In some embodiments, the fastening part may be integral, preferably one-piece, with the opening part. In some alternative embodiments, the fastening part may be separate from but secured to the opening part. In further alternative embodiments, the opening element is not fastened to the body, but only held in place by the body walls.

According to an embodiment, the body may have at least one flat side, the openable section extending in the at least one flat side, the body preferably being a flat bottom bag.

Thus, the design of the openable section and of the opening element may be relatively simple, while allowing the packaging to stand stably on its flat side before being positioned in a dosing system.

According to an embodiment, the body may comprise a rim extending laterally away from the interior volume and, preferably, substantially orthogonally to an activation direction along which the predetermined external force is exerted, the rim preferably surrounding the openable section, and the rim preferably comprises through holes for receiving holder elements configured to support the openable section while the opening is created.

Thus, when the rim receives the holder elements, it may be clamped in place, such that the bottom of the body may be kept flat enough and/or be stiffened, in particular at the openable section, which may facilitate the creation of the opening by the opening part.

According to an embodiment, the body or at least its activation section may be made of a flexible material, the opening element being preferably stiffer than the body, and/or the body and/or the opening element may be made out of recyclable material, like paper-based material. In some embodiments, the body may include a transparent polymer forming a window in its side walls to enable a user to view the level of flowable product inside the body.

Alternatively or additionally, the body and/or the opening element may be made out of plastics or a polymer. In some embodiments, the body may be made out of a laminate including a paper-based material and a polymer.

In some embodiments, the body and the opening element may be made out of the same material.

In some embodiments, the body may be manufactured out of one or more blank(s).

In some embodiments, the body may have a symmetrical shape or a dissymmetrical shape.

Thus, the body may be flexible, in particular more flexible than the opening element, which may facilitate the creation of the opening by the opening element. Further, the body and/or the opening element may be recycled.

According to another aspect, the present invention is directed to a support for supporting a packaging according to claim 11, comprising a frame for accommodating the packaging, and a clamping element which comprises holder elements, the holder elements preferably protruding towards the frame, wherein the clamping element is slidably linked to the frame so as to be moveable between:

a disengaged position where the holder elements are distanced from the frame so as to allow insertion of the packaging, and a locking position where the holder elements are received in the through holes so as to clamp the rim between the frame and the clamping element with the holder elements preferably protruding through the through holes if present.

Thus, such a support enables a user to conveniently recharge a flowable product into the dosing system while keeping the flowable product clean and sealed into the packaging. Indeed, the support may couple the packaging to a dosing system, while keeping the bottom of the body flat enough to facilitate the creation of the opening by the opening part.

In some embodiments where the through holes are not present, the rim may be gripped by the frame, e.g. on one side of the rim, and by the clamping element, e.g. on the opposite side of the rim, wherein the holder elements may be formed by regions having relatively large friction coefficients for enhancing said gripping.

According to yet another aspect, the present invention is directed to a dosing system comprising:

a packaging according to any one of the afore-described aspect and embodiments, a receiving section configured to receive at least the openable section of the packaging and the flowable product dispensed through the opening, a dosing unit configured to selectively dose the flowable product and having a dosing outlet, and a delivery unit fluidly connecting the receiving section to the dosing unit, the delivery unit being configured to deliver the flowable product to the dosing unit.

Thus, such a dosing system enable a user to conveniently recharge a flowable product into the dosing system while keeping the flowable product clean and sealed into the packaging.

According to an embodiment, the delivery unit may comprise a conveyor to deliver the flowable product to the dosing outlet, and/or the dosing unit may comprise a valve being selectively openable to selectively dose the flowable product.

Thus, such a conveyor or valve may enable a user to discharge the packaging and obtain doses of the flowable product that may for example be used to prepare a food or beverage product.

According to an embodiment, the dosing system may further comprise a support, preferably a support according to the afore-described aspect, for carrying the packaging. Preferably, the support, more preferably the clamping element, comprises a coupling section configured for a tight coupling with the receiving section, preferably to form a closed delivery channel from the opening created at the openable section to the dosing outlet.

Thus, such a support may couple the packaging to a dosing system in a tight manner, in particular before the opening of the packaging.

4. BRIEF DESCRIPTION OF DRAWINGS

Further features, details and advantages of the present invention are described hereinafter, in particular in relation to the embodiments illustrated in the appended figures, in which:

FIG. 4 shows a schematic cross-section along plane IV in FIG. 1;

FIG. 11 shows a view similar to FIG. 10, wherein the packaging is completely inserted in the support of FIG. 10 and holder elements of the support do not engage the packaging;

FIG. 12 shows a schematic cross-section along plane XII in FIG. 11;

FIG. 13 shows a view similar to FIG. 11, wherein the holder elements of the support engage the packaging;

FIG. 14 shows a view similar to FIG. 12 of the packaging and support in the engaged state as shown in FIG. 13;

FIG. 15 shows a schematic perspective view of a dosing system according to yet another aspect of the present invention and comprising the packaging and the support of FIGS. 11-14, in a decoupled state;

FIG. 16 shows a view similar to FIG. 15 in a coupled state; and

FIG. 17 shows a schematic cross-section along plane XVII in FIG. 16.

5. DETAILED DESCRIPTION

Figures 1, 2:
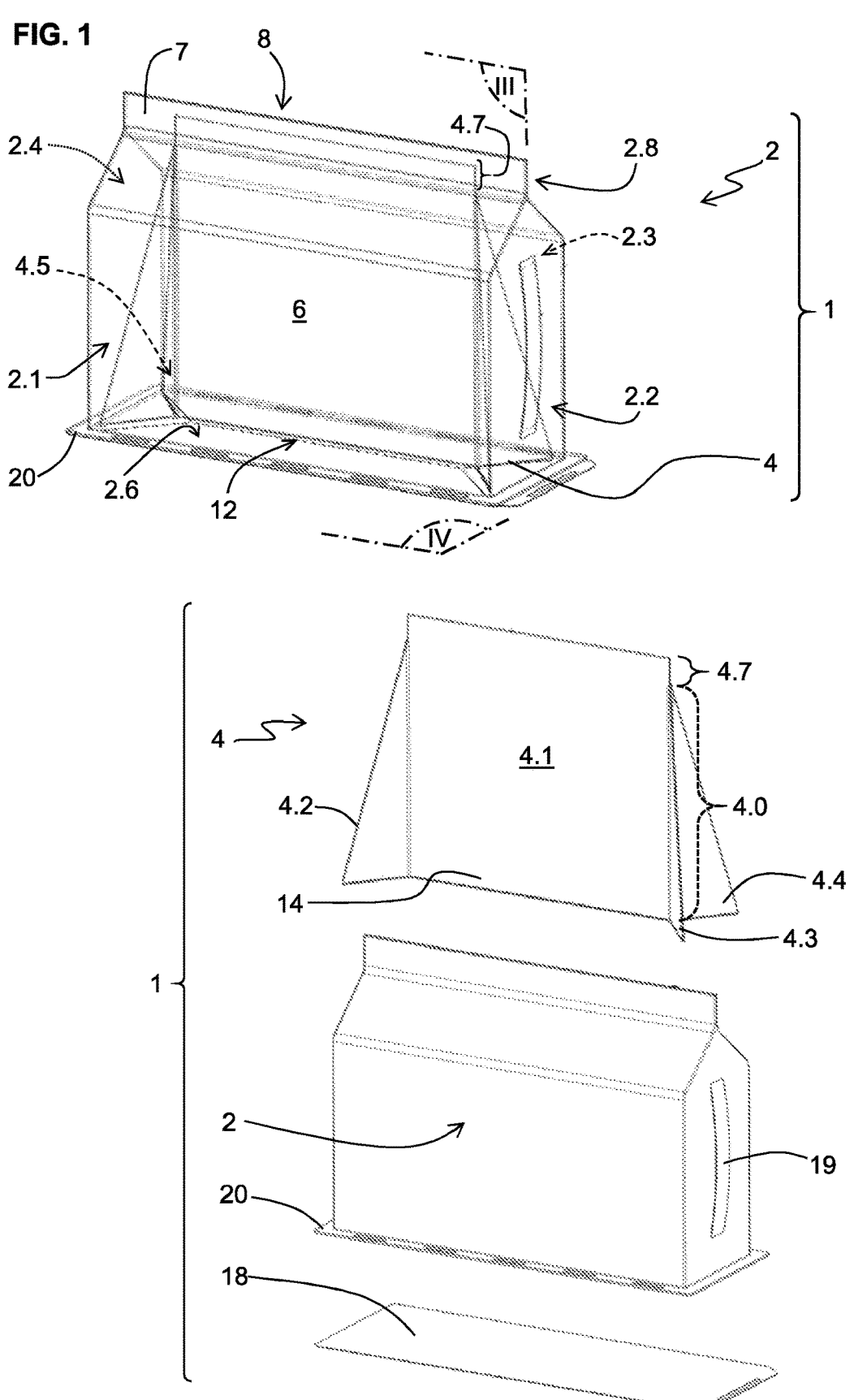
FIG. 1 shows a schematic, transparent perspective view of a packaging according to an aspect of the present invention, in a closed state.
FIG. 2 shows a schematic exploded perspective view of the packaging of FIG. 1; according to an embodiment.

FIGS. 1 and 2 show a packaging 1 which comprises a body 2 and an opening element 4. The body 2 defines an interior volume 6 for carrying a not shown flowable product, for example an edible powder for preparing a food or beverage product.

The body 2 may be a flat bottom bag and may have at least one flat side. As shown in FIGS. 1-2, the body 2 may generally have a parallelepipedal shape. The parallelepi-pedal shape may be topped by a volume generally having the shape of a triangular prism. The body 2 may be formed by four side walls 2.1, 2.2, 2.3, 2.4 and a bottom wall 2.6 joined to the side walls 2.1-2.4. Opposite the bottom wall 2.6, the side walls 2.1-2.4 may be joined to form an upper portion 2.8 of the body 2. The body 2 may have a symmetrical shape as shown in FIGS. 1-17. Alternatively, the body 2 may have a dissymmetrical shape.

In the present disclosure, the relative terms "bottom", "top", "side" may relate to the orientation of the packaging in FIG. 1. When the packaging 1 is in service in a dosing system 201 as shown in FIGS. 15-17, the flowable product may flow out of packaging 1 under the action of gravity, hence via bottom wall 2.6 which may previously bear the weight of the flowable product.

The body 2 may be a sealed bag or sealed pouch and it may comprise a sealing line 7 at the upper portion 2.8. The body 2 may be manufactured out of one or more blank(s). The or each blank may be formed of a plurality of sheets glued or welded together. The or each blank may be pro-vided with folding lines and/or welding lines so as to form the bottom wall 2.6 and side walls 2.1-2.4. Preferably, the body 2 may be made of recyclable material, like paper-based material. The sealing line 7 may be a welding line. In the present disclosure, the term "welding line" may refer to a line that is welded or glued.

Figures 3, 5:
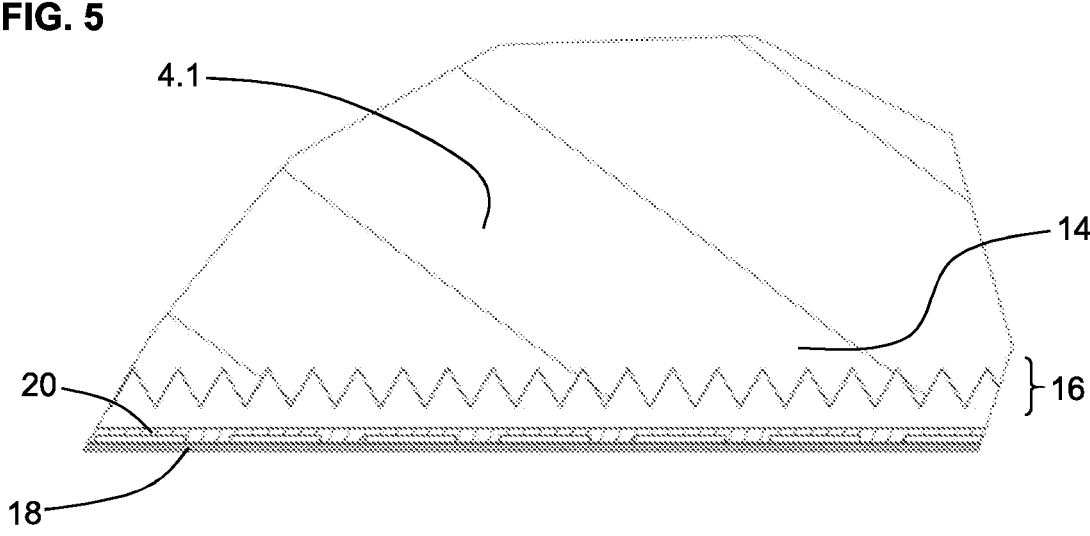
FIG. 3 shows a schematic cross-section along plane III in FIG. 1.
FIG. 5 shows an enlarged view of detail Vin FIG. 3.

As visible in FIG. 2, the opening element 4 comprises an opening part 4.0. The opening part 4.0 is arranged inside the interior volume 6. The opening element 4 may further comprise a fastening part 4.7, which may be sealed in the sealing line 7. Thus, the opening element 4 may be fastened to the body 2. Preferably, the fastening part 4.7 may be integral, preferably one-piece, with the opening part 4.0 as shown in FIGS. 1-3. In an alternative embodiment, the fastening part may be separate from but secured to the opening part. In another alternative embodiment, the open-ing element is not fastened to the body, but only held in place by the body walls.

The body 2 has an activation section 8, which is config-ured to activate the opening element 4 as further described hereinafter. The activation section 8 may be located on the upper portion 2.8, herein on a central portion of the upper portion 2.8. The sealing line 7 may be formed at or near the activation section 8.

Figures 6, 7:
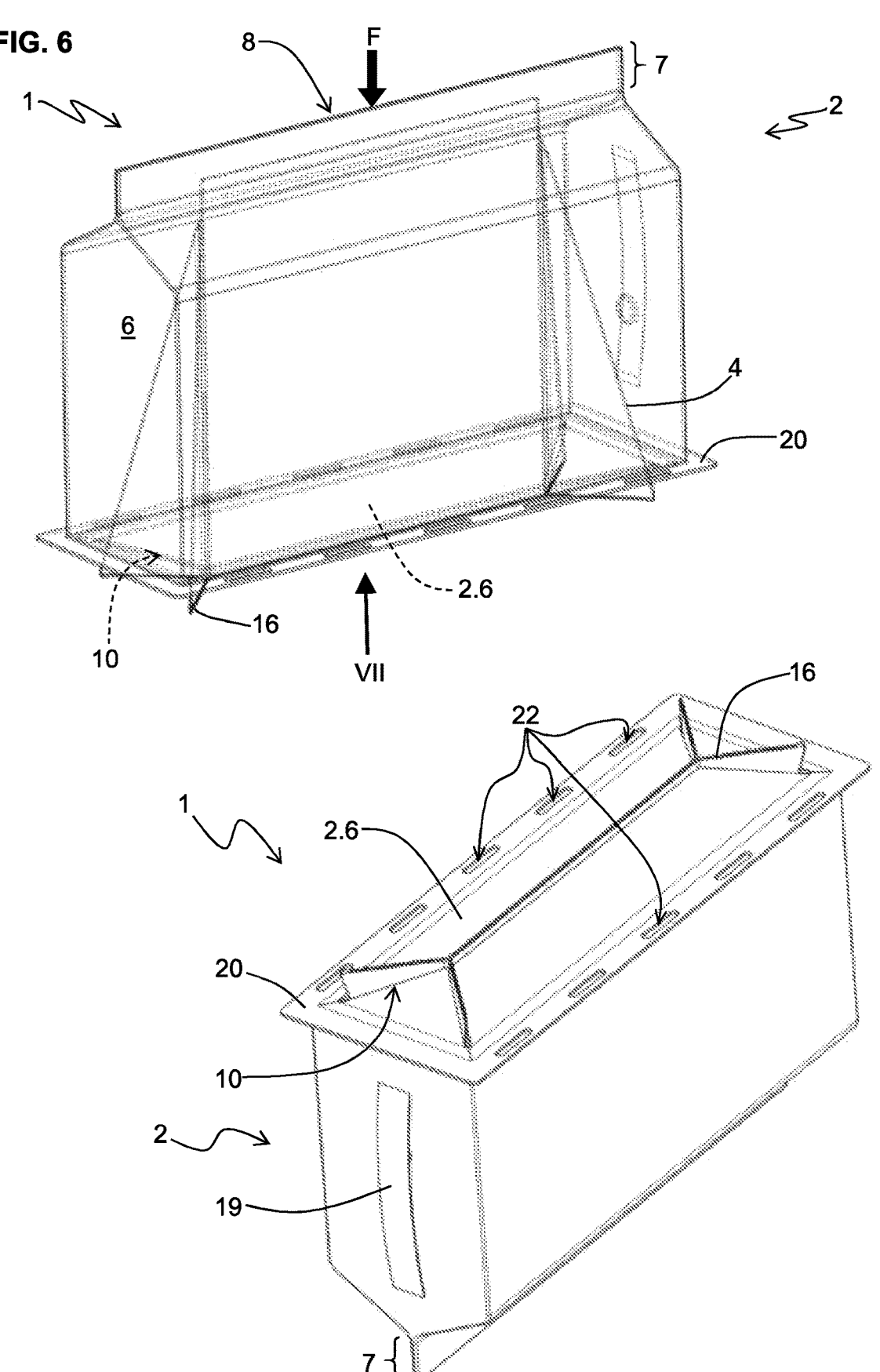
FIG. 6 shows a schematic, transparent perspective view of the packaging of FIG. 1 in an opened state.
FIG. 7 shows a schematic perspective view, as seen along arrow VII in FIG. 6, of the packaging of FIG. 6 in the opened state.

As symbolized in FIG. 6, the body 2 is configured such that, when a predetermined external force F is exerted on the activation section 8, the activation section 8 is displaced relative to—herein towards—the interior volume 6, under the action of predetermined external force F, so as to activate the opening element 4 until the opening part 4.0 creates an opening 10 (FIGS. 6-7). In particular, as the opening element 4 may be fastened to the body 2 via the fastening part 4.7, displacing the activation section 8 towards the interior volume 6 may directly displace the opening part 4.0 down to the bottom wall 2.6.

The external force F may be predetermined as having:

an amplitude sufficient to tear open the openable section, which may have a weakened portion or not, a direction substantially vertical and, preferably, downwards, such that the opening may be created in a lower or lowermost portion of the body, like bottom wall 2.6.

So, the amplitude of the predetermined external force F may vary quite broadly depending on e.g. the dimensions and materials of the body 2. Likewise, the direction of the predetermined external force F may vary quite broadly depending on e.g. the design of the body 2.

In service, a user may easily find out how to exert a suitable predetermined external force F while starting to exert it, e.g., based on tactile and/or auditory feedback. Further, the body 2 and opening element 4 may be designed such that a suitable predetermined external force F may be intuitively guessed by the user.

As shown in FIGS. 6-7, the opening 10 extends in the openable section 12 of the body 2 visible in FIGS. 1 and 4. The openable section 12 may be positioned at a side of the body 2 that lies opposite the activation section 8 relative to the interior volume 6. Preferably, the openable section 12 may extend in a flat side of the body 2, herein in the bottom wall 2.6.

The openable section 12 may comprise a weakened portion, like a tear line as shown in the example of FIGS. 1 and 4. Preferably, the openable section 12 may extend along the activation section 8. The weakened portion, in particular when it has a tear line, may be composed of through holes, blind holes, through slits, incisions and/or blind slits. Preferably, the weakened portion may be composed of blind holes and/or blind slits in order to enhance the tightness of the interior volume 6 to ambient moisture and to the flowable product. The weakened portion may be made by laser scoring.

Thus, the packaging 1 may initially be in a closed state as shown in FIGS. 1-4, and finally, after activating the opening element 4, be in an opened state as shown in FIGS. 6-7. In the opened state, the opening 10 allows the flowable product to flow out of the interior volume 6. When the packaging 1 is coupled to the dosing system 201 of FIGS. 15-17 and put in the opened state, the flowable product may be dispensed out of packaging 1 by the dosing system 201 to be used downstream for preparing a food or beverage product.

As shown in FIGS. 1-3 and 5, the opening part 4.0 may extend between the activation section 8 and the openable section 12, and herein even from the activation section 8 almost to the openable section 12 as visible in FIG. 3. Thus, the predetermined external force F may be transmitted by the opening element 4, hence the opening part 4.0, to the openable section 12 over a relatively short distance, which may facilitate the manual opening of the packaging 1.

As shown in FIGS. 1-2, the opening element 4 may comprise a core member 4.1 and four wings 4.2, 4.3, 4.4, 4.5 projecting two by two from the sides of the core member 4.1. The core member 4.1 may generally have the shape of a rectangular wall. The wings 4.2, 4.3, 4.4, 4.5 may generally have the same shape, for example the shape of a right triangle. The star-like extension of wings 4.2-4.5 may help stabilize the opening element 4 in lateral direction relative to the body 2, both when the packaging is empty and when it is filled with the flowable product.

The opening element 4 may nevertheless come in many various shapes. For example, some wings or side walls may be bent or beveled instead of projecting upright from the bottom wall. As a simpler example, the opening element may generally have the shape of a rectangle, without wings or side walls.

As shown in FIGS. 2 and 5, the opening part 4.0 may comprise an activation part 14 which may be facing the openable section 12, preferably, at a short distance ranging for example between 1 mm and 10 mm, preferably 1 mm and 5 mm. Such a short distance may thus help avoid that the activation part 14 accidentally opens the openable section 12, e.g., during transportation, manipulation or storage of packaging 1 due to impacts or vibrations. Alternatively, the activation part may be facing the openable section while resting into contact with the bottom wall.

The activation part 14 may be configured to interact with the openable section 12 when the opening element 4 is activated until the activation part 14 creates the opening 10. In an alternative embodiment, the activation part may be separate from but secured to the opening part.

As best shown in FIG. 2, the opening element 4, preferably also its activation part 14, may substantially span the interior volume 6, at least near bottom wall 2.6, when seen across the openable section 12, i.e., perpendicular to the direction of the predetermined external force F. Thus, the opening element 4 may extend over much or all of the openable section 12, which may ensure the creation of a large opening 10, hence of a large flow rate of flowable product out of the packaging 1. In particular, the activation part 14 may press against the bottom wall 2.6 over long lines, which ensures that the openable section 12 gets opened with a large opening 10 and enhances a large flow rate of the flowable product out of the packaging 1.

As shown in FIG. 5, the activation part 14 may include a cutting edge 16, which may have teeth to cut open the openable section 12. Preferably, the activation part 14 may press or tear the weakened portion or tearing line of the openable section 12 if present.

The body 2, at least its activation section 8, may be made out of a flexible material. The opening element 4 may preferably be stiffer than the body 2, at least in the direction of the predetermined external force F. Thus, displacing the activation section 8 may mainly flex the side walls 2.1-2.4 and not (much) the opening element 4, such that the opening element 4, hence the opening part 4.0, may transmit most of the predetermined external force figure to the openable section 12. If the opening element 4 is made of the same material as the body 2, for example of a paper-based material like cardboard, then the opening element 4 may be selected thicker than the walls of the body 2 such that the opening element 4 may be stiffer than the body 2.

Figures 8, 9, 10:
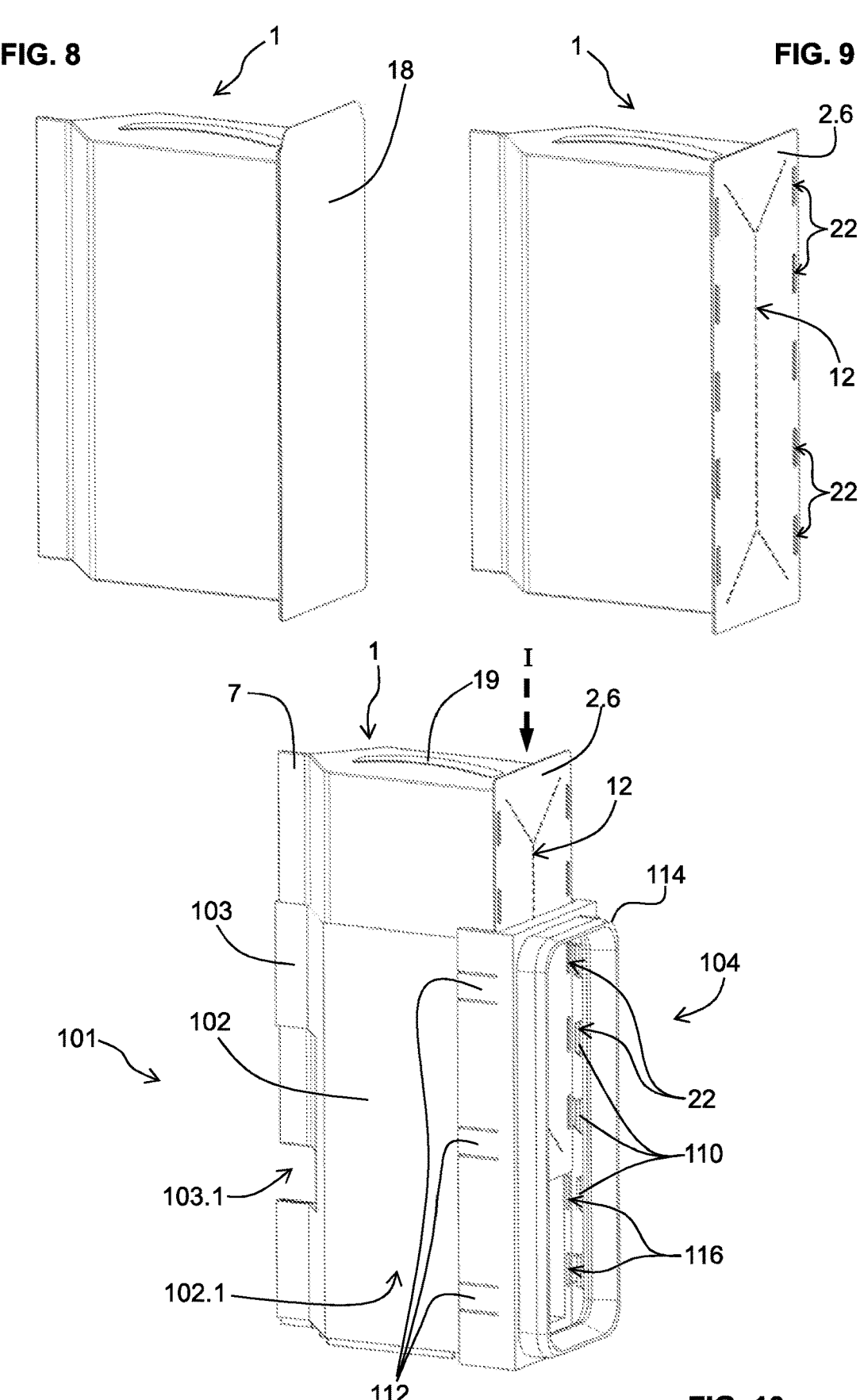
FIG. 8 shows a schematic perspective view of the packaging of FIG. 1, along a different angle and wherein an outer side of the op enable section is covered.
FIG. 9 shows a view similar to FIG. 8, wherein the outer side of the openable section is exposed.
FIG. 10 shows a schematic perspective view, as seen along the same angle as FIGS. 8-9, of the packaging of FIGS. 8-9 being partially inserted in a support according to another aspect of the present invention.

As shown in FIGS. 2 and 8, the packaging 1 may further comprise a covering membrane 18, which is arranged to cover the outer side of the bottom wall 2.6. The covering membrane 18 may generally have a rectangular shape. The covering membrane 18 may enhance the tightness to ambient moisture and to the flowable product, in particular in case the openable section 12 includes a tear line composed of through holes and/or through slots. The covering membrane 18 may be made out of a waterproof material, for example a polymer.

The covering membrane 18 may be sticked to the bottom wall 2.6 so as to be peelable. A user may thus remove the covering membrane 18 shortly before the opening of the packaging 1. FIGS. 8 and 9 illustrate the packaging 1 respectively with and without the covering membrane 18, i.e., respectively before and after the covering membrane 18 is peeled off.

The packaging 1 may be transported and stored empty before getting filled with the flowable product and sealed before commercialization. When the packaging 1 is filled with the flowable product, the weight of the flowable product may bear on the bottom wall 2.6 and side walls 2.1-2.4 as well on the opening element 4.

Thus, the flowable product may help stabilize the opening element 4 during filling and storage of the packaging 1 as well as during the creation of the opening 10. Preferably, the side walls 2.1-2.4 may extend substantially vertically during the creation of the opening 10, so as to enhance this stabilization effect and allow guidance of the opening element 4.

Further, the packaging 1 may comprise a handle 19 for enabling a user to carry the packaging 1. The handle 19 may be affixed to a side wall 2.2.

As best shown in FIGS. 4 and 7, the body 2 may comprise a rim 20. The rim 20 may extend laterally away from the interior volume 6 and herein from the side walls 2.1-2.4. Preferably, the rim 20 may extend an activation direction along which the predetermined external force F is exerted. Preferably, the rim 20 may surround the openable section 12.

As further described in relation to FIGS. 10-14, the rim 20 may comprise a plurality of through holes 22 for receiving holder elements 110, which are configured to support the openable section 12 while the opening 10 gets created. The through holes 22 may generally have the shape of elongated slits.

FIGS. 10-14 show a support 101 for supporting the packaging 1 and coupling it to the dosing system 201 of FIGS. 15-17. The support 101 comprises a frame 102 and a clamping element 104.

The frame 102 is configured for accommodating the packaging 1. The frame 102 may be configured to define an accommodation space which generally has a shape complementary to the outer shape of the packaging 1. In FIG. 10 the motion of inserting packaging 1 into frame 102 is symbolized by an arrow 1.

The frame 102 may include at least two side walls 102.1 and 102.3 designed such that the accommodation space may generally have a parallelepipedal shape topped by a triangular prism of similar dimensions as the packaging 1.

Figures 11, 12, 13, 14:
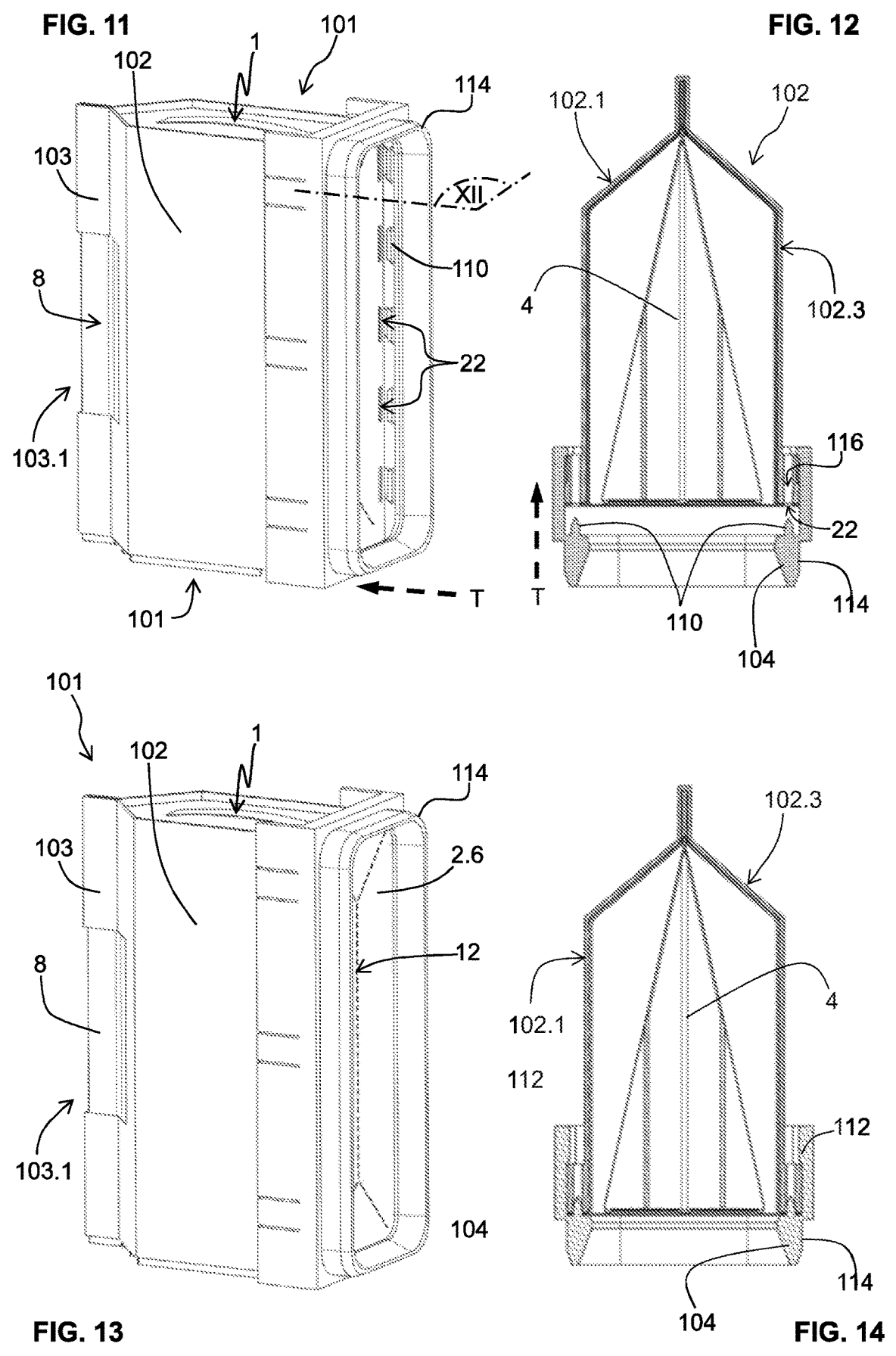

Further, the frame 102 may have a top portion 103 designed to accommodate the sealing line 7 of the packaging 1. As shown in FIGS. 10, 11 and 13, the frame 102 may have a window 103.1 cut out in the top portion 103. When the packaging 1 is accommodated in the frame 102, the activation section 8 may be exposed through the window 103.1 such that a user may exert the predetermined external force F as afore-described.

The frame 102 may be configured to limit or even minimize the deformation of the body 2 caused by the predetermined external force F, such that the opening element 4 may reliably and quickly reach the openable section 12. In particular, clamping the rim 20 between frame 102 and clamping element 104 may keep the bottom wall 2.6 flat enough to facilitate the creation of the opening 10 by the opening part 4.0. For the sake of expediency, the deformation of the body 2 is not shown in the figures representing states in which the predetermined external force F is exerted.

Thus, the support 101 may enable a user to conveniently recharge flowable product into the dosing system 201 while keeping the flowable product clean and sealed into the packaging 1.

The clamping element 104 comprises the holder elements 110, which are configured to be received in the through holes 22 of the rim 20. The holder elements 110 are arranged on an annular part of the clamping element 104 so as to protrude towards the frame 102. The holder elements 110 may be formed by lugs in corresponding shapes and, preferably, number to be received in the through holes 22 of the rim 20. In the illustrated example, there are five holder elements 110 and five through holes 22 on each side of the bottom wall 2.6.

The clamping element 104 is slidably linked to the frame 102 so as to be moveable between:

a disengaged position (FIGS. 10-12), in which the holder elements 110 are distanced, hence disengaged, from the frame 102 and frame holes 116 (FIG. 10, 12), so as to allow insertion of the packaging 1 in the frame 102 along arrow 1 in FIG. 10, and a locking position (FIGS. 13-17), in which the holder elements 110 are received in the through holes 22, protrude therethrough and engage frame holes 116 (FIG. 10, 12), so as to clamp the rim 20 between the frame 102 and the clamping element 104.

In FIGS. 11-12 the sliding or translation of clamping element 104 relative to frame 102 is symbolized by an arrow T. In the locking position (FIGS. 13-17), the packaging 1 may not move relative to the frame 102, and a user may carry the packaging 1 together with the support 101 by the handle 19.

The clamping element 104 may comprise clips 112, herein three on each side of the clamping element 104. The clips 112 may be elastically deformable to hold the clamping element 104 and the frame 102 together. In particular, the clips 112 may be elastically deformable between:

an assembling configuration (not shown) in which they may be elastically deformed outwards, to enable the assembly of the clamping element 104 with the frame 102, and a holding configuration in which they may be in a rest position and abut on an annular shoulder of the frame 102 (FIG. 12), thus holding the clamping element 104 to the frame 102 together.

The support 101 may further comprise a coupling section 114 configured to tightly couple the clamping element 104 to a receiving section 202 of the dosing system 201 of FIGS. 15-17. The clamping element 104 and the receiving section 202 may have complementary shapes, for example male and female shapes or vice versa, such that the clamping element 104 may easily be fitted or plugged, along arrow C in FIG. 15, into the dosing system 201 in a tight manner vis-a-vis the flowable product.

In the example of FIGS. 11-17 the coupling section 114 may generally have an annular and rectangular male shape. The coupling section 114 may be arranged on the same annular part as and the holder elements 110, thus enhancing the compactness of the clamping element 104.

Thus, the support 101 may couple the packaging 1 to the dosing system 201 of FIGS. 15-17, while keeping the bottom wall 2.6 flat enough to facilitate the creation of the opening 10 by the opening part 4.0.

FIGS. 15-17 show the dosing system 201, which comprises:

the packaging 1, preferably, the support 101 for carrying the packaging 1, the receiving section 202, a dosing unit 204, and a delivery unit 206.

The receiving section 202 is configured to receive at least the openable section 12 of the packaging 1. The receiving section 202 may define a passage for the flowable product to flow through once the opening 10 is created. As afore-mentioned, the receiving section 202 and the coupling section 114 of the support 101 may be tightly coupled due to their complementary shapes. Thus, the support 101, preferably its clamping element 104, may easily be fitted or plugged into the dosing system 201 in a tight manner vis-a-vis the flowable product.

The dosing unit 204 is configured to selectively dose the flowable product. The dosing unit 204 has a dosing outlet 208, which may form a downstream end of the dosing system 201 through which multiple doses of the flowable product may be dispensed. The dosing unit 204 may com-prise a valve, which may be selectively openable to dispense doses of flowable product.

The delivery unit 206 fluidly connects the receiving section 202 to the dosing unit 204. The delivery unit 206 is configured to deliver the flowable product to the dosing unit 204. The delivery unit 206 may comprise a conveyor suit-able for conveying the flowable product. In the example of FIGS. 15-17, the conveyor may include a well-known endless screw for conveying the flowable product in a powdery state.

A closed delivery channel may thus be formed between the packaging 1 and its opening 10, the receiving section 202, the delivery unit 206, the dosing unit 204 and its dosing outlet 208.

The dosing system 201 may further comprise a not shown user interface configured to receive requests from a user to selectively operate the delivery unit 206 and the dosing unit 204, so as to open the valve and get a dose of flowable product dispensed through the dosing outlet 208.

In service, the packaging 1, the support 101 and the dosing system 201 may be used as follows, the membrane may be first removed, for example manually by a user. Then, the packaging 1 may be inserted in the support 101 along arrow 1 in FIG. 10, for example by the user holding the handle 19 and pushing on the side wall 2.2.

Once the packaging 1 is inserted in the support 101, the clamping element 104 may be slid towards the frame 102 along arrow T in FIGS. 11-12. As shown in FIGS. 13-14, the clamping element 104 and frame 102 may be tightly coupled to one another and the bottom wall 2.6 may be held relatively flat and stiff, in particular as the holder elements 110 are received in the through holes 22 and the rim 20 is clamped between clamping element 104 and frame 102.

Once coupled, on the one hand, to the support 101, the packaging 1 may be coupled, on the other hand, to the dosing system 201 by fitting or plugging the coupling section 114 in the receiving section 202 along arrow C as shown in FIG. 15. Once the coupling section 114 and the receiving section 202 are coupled, as shown in FIG. 16, the support 101 ensures a correct positioning of the packaging 1 relative to the dosing system 201, in particular as the clamping element 104 and the coupling section 114 respec-tively cooperate with the packaging 1 and the receiving section 202.

At this stage where the packaging 1 is positioned in the support 101 which itself is coupled to the dosing system 201 as shown in FIG. 16, the packaging 1 may still be hermeti-cally closed with the flowable product packed in it.

The packaging 1 may preferably be opened once the support 101 is supporting the packaging 1 and coupled to the dosing system 201. A user may exert the predetermined activation force F on the activation section 8 to move the opening element 4, in particular the opening part 4.0, until it reaches the bottom wall 2.6, as the activation section 8 and, as the case may be, further parts of the body 2 is(are) deforming.

Then, the activation part 14 may reach and interact with the openable section 12. In particular, the cutting edge 16, possibly including teeth, may cut the weakened portion, possibly including a tear line, thus creating the opening 10. Once the opening 10 is created, the flowable product may flow through the opening 10 down to the delivery unit 206 under the action of gravity.

The flowable product may be conveyed through the delivery unit 206 downstream to the dosing unit 204 and past the dosing outlet 208, as the valve thereof is actuated, for example by a user controlling a user interface. The flowable product may then be used to prepare a food or beverage product, for example a coffee product.

Once the packaging 1 is empty, the assembly may be disassembled, in order to replace the empty, opened pack-aging 1 by a full, closed packaging. As hereinafter described, the disassembling roughly occurs in the reverse order (FIG. 16 back to FIG. 10) and with reverse operations relative to the afore-described assembly.

First, the support 101 together with the packaging 1, including body 2 and opening element 4, may be decoupled from the receiving section 202 of the dosing system 201. When the coupling between coupling section 114 in receiv-ing section 202 is operated by fitting or plugging, drawing the support 101 in a direction opposite arrow C (FIG. 15) may suffice to unplug, hence decouple, the support 101 from the receiving section 202.

After decoupling the support 101 from the receiving section 202, the clamping element 104 may be partially disengaged from the frame 102, that is, the holder elements 110 may be released out of the frame holes 116 (FIG. 10, 12) and through holes 22. Thus, the rim 20 is no longer clamped between clamping element 104 and frame 102.

At this point, the packaging 1 may be removed out of the support 101 by sliding the packaging 1 out of the frame 102 in a direction opposite arrow 1 in FIG. 10. The packaging 1 may then be discarded into a recycling stream.

The present invention is not limited to the afore-described aspects and embodiments, as long as the present invention remains covered by the appended claims.

The invention claimed is:

1. Packaging comprising:

a body defining an interior volume for carrying a flowable product, and an opening element comprising an opening part which is arranged inside the interior volume, wherein the body is configured such that, when a prede-termined external force is exerted on an activation section of the body, the activation section is displaced relative to the interior volume so as to activate the opening element until the opening part creates an opening extending in an openable section of the body and allowing the flowable product to flow out of the interior volume, and wherein the body is a sealed bag or sealed pouch, the body having at least one sealing line, wherein the opening element further comprises a fastening part, the fasten-ing part being sealed in the at least one sealing line.

2. Packaging according to claim 1, wherein the activation section is displaced towards the interior volume so as to activate the opening element until the opening part creates the opening.

3. Packaging according to claim 1, wherein the opening part extends between the activation section and the openable section, or from the activation section almost to the openable section.

4. Packaging according to claim 1, wherein the openable section is positioned at a side of the body opposite the activation section relative to the interior volume.

5. Packaging according to claim 1, wherein the opening part comprises an activation part facing the openable section, and wherein the activation part is configured to interact with the openable section when the opening element is activated until the activation part creates the opening.

6. Packaging according to claim 5, wherein the activation part is formed by an edge of the opening element and/or wherein the activation part is comprised of a cutting edge, and/or wherein, when seen across the openable section, the opening part substantially the interior volume.

7. Packaging according to claim 6, wherein an activation part of the opening part spans the interior volume.

8. Packaging according to claim 5, wherein the opening is created by tearing the openable section.

9. Packaging according to claim 1, wherein the openable section comprises a weakened portion.

10. Packaging according to claim 9, wherein the weakened portion is in the form of a tear line or incisions extending along the activation part, if present.

11. Packaging according to claim 1, wherein the body has at least one flat side, the openable section extending in the at least one flat side.

12. Packaging according to claim 11, wherein the body is a flat bottom bag.

13. Packaging according to claim 1, wherein the body or at least its activation section is made of a flexible material, and wherein the body and/or the opening element is made out of recyclable material.

14. Packaging according to claim 13, wherein the opening element is stiffer than the body, and wherein the recyclable material is a paper-based material.

15. Packaging according to claim 1, wherein the body comprises a rim extending laterally away from the interior volume.

16. Support for supporting a packaging according to claim 15, comprising a frame for accommodating the packaging, and a clamping element which comprises holder elements protruding towards the frame, wherein the clamping element is slidably linked to the frame so as to be moveable between:

a disengaged position where the holder elements are distanced from the frame so as to allow insertion of the packaging, and a locking position where the holder elements are received in the through holes so as to clamp the rim between the frame and the clamping element with the holder elements protruding through the through holes.

17. Packaging according to claim 15, wherein the rim comprises through holes for receiving holder elements configured to support the openable section while the opening is created.

18. Packaging according to claim 15, wherein the rim extending laterally away from the interior volume is substantially orthogonal to an activation direction along which the predetermined external force is exerted, and wherein the rim surrounds the openable section.

19. Dosing system comprising:

a packaging according to 1, a receiving section configured to receive at least the openable section of the packaging and the flowable product dispensed through the opening, a dosing unit configured to selectively dose the flowable product and having a dosing outlet, and a delivery unit fluidly connecting the receiving section to the dosing unit, the delivery unit being configured to deliver the flowable product to the dosing unit.

20. Dosing system according to claim 19, wherein the delivery unit comprises a conveyor to deliver the flowable product to the dosing outlet, and/or wherein the dosing unit comprises a valve being selectively openable to selectively dose the flowable product.

21. Dosing system according to 19, further comprising a support for carrying the packaging wherein the support or the clamping element, if present, comprises a coupling section configured for a tight coupling with the receiving section.

22. Packaging according to claim 21, wherein the coupling section is present, and the tight coupling forms a closed delivery channel from the opening created at the openable section to the dosing outlet.

23. Dosing system comprising:

a packaging comprising a body defining an interior volume for carrying a flowable product, and an opening element comprising an opening part which is arranged inside the interior volume, wherein the body is configured such that, when a predetermined external force is exerted on an activation section of the body, the activation section is displaced relative to the interior volume so as to activate the opening element until the opening part creates an opening extending in an openable section of the body and allowing the flowable product to flow out of the interior volume, a receiving section configured to receive at least the openable section of the packaging and the flowable product dispensed through the opening, a dosing unit configured to selectively dose the flowable product and having a dosing outlet, and a delivery unit fluidly connecting the receiving section to the dosing unit, the delivery unit being configured to deliver the flowable product to the dosing unit.

24. Dosing system according to claim 23, wherein the delivery unit comprises a conveyor to deliver the flowable product to the dosing outlet, and/or wherein the dosing unit comprises a valve being selectively openable to selectively dose the flowable product.

25. Dosing system according to claim 23, wherein the activation section is displaced towards the interior volume so as to activate the opening element until the opening part creates the opening.

26. Dosing system according to claim 23, wherein the opening part extends between the activation section and the openable section, preferably or from the activation section almost to the openable section.

27. Dosing system according to claim 23, wherein the openable section is positioned at a side of the body opposite the activation section relative to the interior volume.

28. Dosing system according to claim 23, wherein the opening part comprises an activation part facing the openable section, and wherein the activation part is configured to interact with the openable section when the opening element is activated until the activation part creates the opening.

29. Dosing system according to claim 28, wherein the activation part is formed by an edge of the opening element and/or wherein the activation part is comprised of a cutting edge, and/or wherein, when seen across the openable section, the opening part spans substantially the interior volume.

30. Dosing system according to claim 23, wherein the openable section comprises a weakened portion.

31. Dosing system according to claim 23, wherein the body is a sealed bag or sealed pouch, the body having at least one sealing line, and wherein the opening element further comprises a fastening part, the fastening part being sealed in the at least one sealing line.

32. Dosing system according to claim 23, wherein the body has at least one flat side, the openable section extending in the at least one flat side.

33. Dosing system according to claim 23, wherein the body or at least its activation section is made of a flexible material, and/or wherein the body and/or the opening element is made out of recyclable material.

34. Dosing system according to claim 23, wherein the body comprises a rim extending laterally away from the interior volume to an activation direction along which the predetermined external force is exerted.

35. Dosing system according to claim 34, wherein the rim comprises through holes for receiving holder elements configured to support the openable section while the opening is created.

36. Dosing system according to claim 35, further comprising a support for carrying the packaging comprising a frame for accommodating the packaging, and a clamping element which comprises holder elements protruding towards the frame, wherein the clamping element is slidably linked to the frame so as to be moveable between:

a disengaged position where the holder elements are distanced from the frame so as to allow insertion of the packaging, and a locking position where the holder elements are received in the through holes so as to clamp the rim between the frame and the clamping element with the holder elements protruding through the through holes.

37. Dosing system according to claim 36, wherein the support, comprises a coupling section configured for a tight coupling with the receiving section.

38. Packaging according to claim 1, wherein the at least one sealing line is formed at or near the activation section.

\* \* \* \* \*